No. 804,625. PATENTED NOV. 14, 1905.
D. A. SAVAGE.
LAND LEVELER.
APPLICATION FILED MAY 2, 1905.
2 SHEETS—SHEET 1.
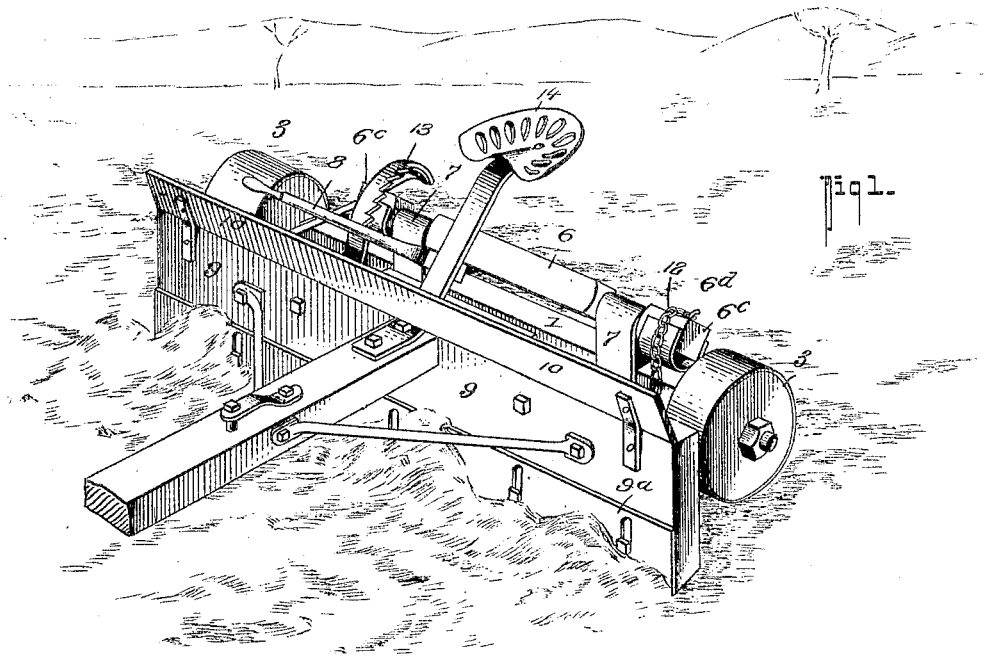
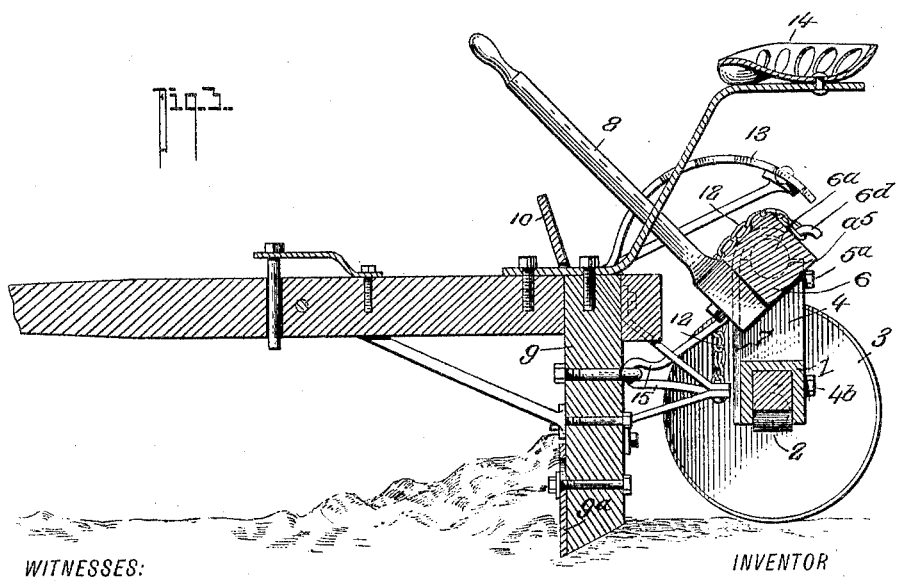
WITNESSES:
John J. Schrott,
May E. Immich.
INVENTOR
David A. Savage.
BY
Fred G. Dieterich & Co.
ATTORNEYS No. 804,625. PATENTED NOV. 14, 1905.
D. A. SAVAGE.
LAND LEVELER.
APPLICATION FILED MAY 2, 1905.
2 SHEETS—SHEET 2.
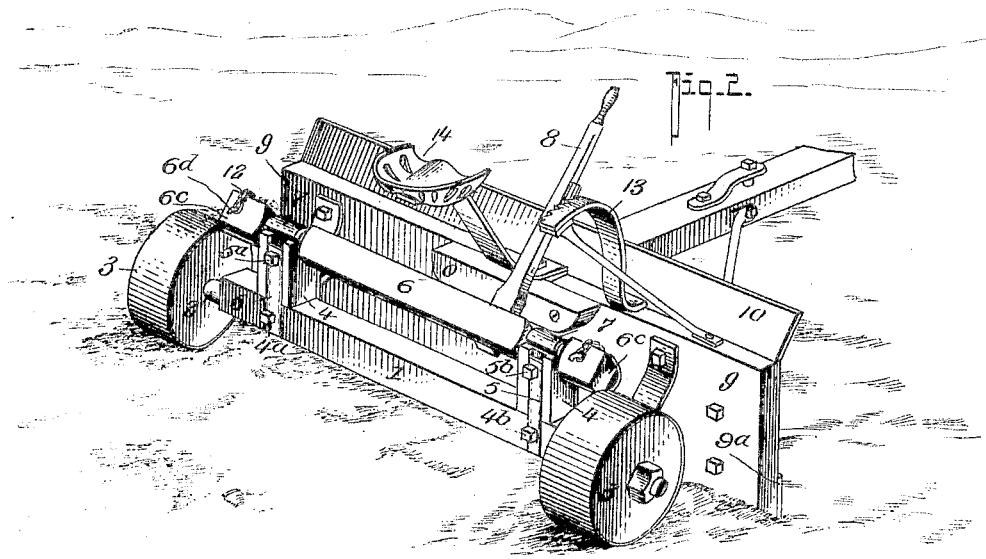
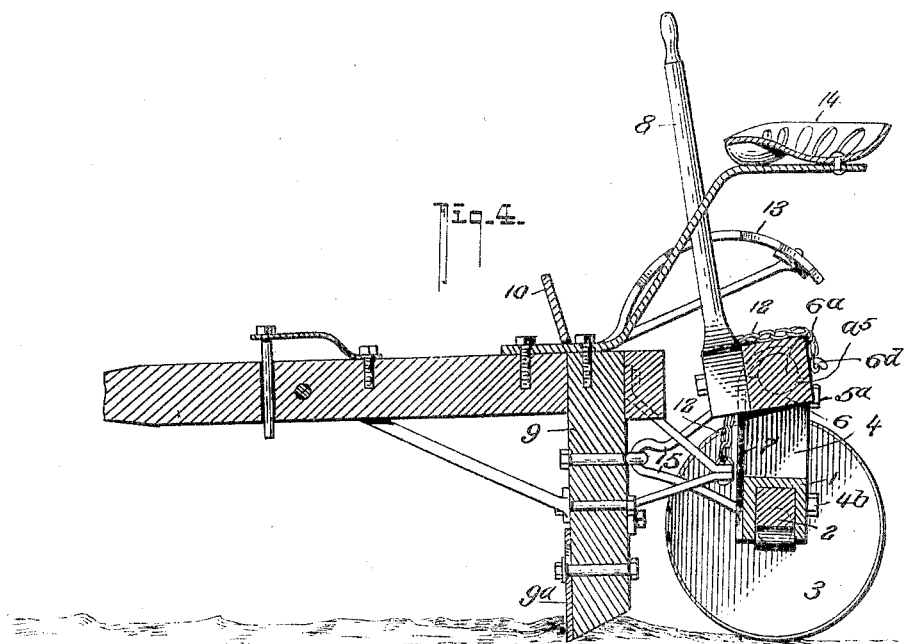
WITNESSES:
John T. Schott,
May E. Immich
INVENTOR
David A. Savage.
BY
Fred G. Dieterich & Co.
ATTORNEYS

UNITED STATES PATENT OFFICE.

DAVID A. SAVAGE, OF MAYOWORTH, WYOMING.

LAND-LEVELER.

No. 804,625.      Specification of Letters Patent.      Patented Nov. 14, 1905.

Application filed May 2, 1905. Serial No. 258,486.

*To all whom it may concern:*

Be it known that I, DAVID A. SAVAGE, of Mayoworth, in the county of Johnson and State of Wyoming, have invented a new and Improved Land-Leveler, of which the following is a specification.

My invention comprehends an improved construction of land-leveling machine, more especially adapted for use for farming in irrigating countries; and it primarily has for its object to provide a machine of the general character stated of a simple and economical construction, easily controlled by the driver while on his seat, and in which the parts have a special coöperative arrangement whereby they can be instantly adjusted by the driver for making deep or shallow cuts and for depositing the gathered soil at the points desired.

My invention embodies generally a scraper joined directly to the draft-pole and on which the driver's seat is directly mounted, a supporting-frame located at the rear of the scraper having a carrying-wheel at each end that runs behind the scraper, a flexible connection that joins the scraper and supporting-frame, and a means under direct control of the driver for raising and lowering the cutting edge of the scraper with respect to the wheeled frame.

In its more subordinate features my invention consists in certain details of construction and peculiar combination of parts, all of which will be hereinafter fully described, and pointed out in the appended claims, reference being had to the accompanying drawings, in which—

Figure 1 is a front perspective view of my improved leveling-machine. Fig. 2 is a rear perspective view of the same. Fig. 3 is a longitudinal section of the same, taken practically on the line 3 3 of Fig. 1, showing the scraper down to its lowermost cutting or scraping position. Fig. 4 is a similar view thereof, showing the scraper elevated to its leveling position.

In the practical construction my improved leveling-machine comprises a supporting-frame composed of a transverse beam 1, on the opposite ends of which is fixedly secured stub-axles 2 2, on each of which is mounted a carrier-wheel 3 3. Near each end of the beam 1 is secured vertical standards 4 4, between which is mounted for vertical adjustment the uprights 5 5, which are secured by the bolts and nuts $5^a$ $5^b$ to the standards 4, which standards are firmly secured to the beam 1 by the bolts and nuts $4^a$ $4^b$, as clearly shown in Figs. 3 and 4, by reference to which it will be seen the upper ends of the uprights 5 5 have rounded bearings $a^5$ $a^5$ to receive the journal portions $6^a$ of a roller-bar 6, which is held to its bearings by the ∩-shaped metal straps or boxes 7 7, the ends of which straddle the upper ends of the uprights 5 5 and are made fast by the bolts $5^a$ $5^b$, as shown.

8 designates a hand-lever for turning the roller-bar 6, made fast to the said bar and projected forwardly adjacent the driver's seat, as shown.

9 designates the combined scraper and leveling members, which preferably is a wide and heavy board having a height greater than the supporting-wheels 3 3 and a length sufficient to extend at the opposite ends beyond the said wheels 3 3, so the said wheels will run behind the scraper-board on the leveled ground. The board has a metal scraper-plate $9^a$ secured to its lower front edge and which is preferably secured to the board 9 for vertical adjustment.

To the upper edge of the board 9 is secured and extended the full length thereof a deflector-piece 10 to prevent the dirt as it is scraped up from crowding over the upper edge of the board 9 and falling back of it.

To the rear of the board 9, at each end thereof and in alinement with the outer ends of the roller-bar 6, is secured a chain or similar flexible member 12, and the said chains 12 pass up and over the heads $6^c$ $6^c$, that form the ends of the roller-bar 6 and which have hooks $6^d$, to which the chains connect in such manner that when the member 6 is rocked rearwardly by the proper manipulation of the lever 8 the scraper and leveling-board, by reason of the chain winding on the heads $6^c$ of the roller 6, is raised, and to hold the said board to its elevated positions a rack-frame 13 is secured to the board 9, with which the lever engages, as shown.

14 designates the driver's seat, which is mounted directly on the upper edge of the board 9 and in such position that the weight of the driver is on the scraper at all times.

15 designates link-brackets secured to the front edge of the bar 1, and to the front end of these brackets is flexibly hinged the scraper-board 9, as clearly shown in Figs. 3 and 4.

From the foregoing, taken in connection with the accompanying drawings, the complete construction and manner in which my invention is operated is readily apparent.

By reason of the special correlation of the parts the capacity of the machine is such that with one team and one man hundreds of tons of dirt can be moved in a day without danger to team or man, and all the dirt collected or scraped up can be deposited just where needed without necessity of the driver leaving his seat and leveled uniformly.

By having the wheels 3 run back of the board 9, running, as it were, on level ground, each end of the scraper-board is held to the level on which the wheels run.

Having thus described my invention, what I claim, and desire to secure by Letters Patent, is—

1. A leveling-machine of the character described, which comprises in combination; a wheeled frame, which includes vertical standards, and a roller-bar journaled in the upper end of said standards and disposed in a plane parallel with the wheeled frame; a scraper-board located in advance of the wheeled frame flexibly hinged to the said wheeled frame to move in a vertical direction and having the draft devices connected thereto; a driver's seat mounted on the said scraper-board and means under control of the driver for elevating the scraper-board and holding it to its adjusted positions substantially as shown and described.

2. A leveling-machine, comprising in combination, a wheeled frame; a scraper-board hinged to the wheeled frame to move vertically; a driver's seat mounted on the upper edge of the scraper-board; a draft means secured centrally to the said board and means mounted on the wheeled frame and on the scraper-board, under control of the driver from his seat for raising the scraper-board and holding it to its adjusted positions.

3. In a machine of the character described, the combination with the wheeled frame, said frame including vertically-adjustable standards, a roller-bar journaled on the upper ends of the said standards, said bar having winding portions at the opposite ends, and a forwardly-projected lever secured to the bar; of the scraper-board, located in front of the wheeled frame, a seat and a rack member mounted on the upper edge of the said board, brackets extended rearwardly from the scraper-board, flexible left members connected to said bracket and wound over the ends of the roller-bar, and flexible hinge connections that join the scraper-bar with the wheeled frame, all being arranged substantially as shown and described.

4. The combination with the wheeled frame member 1, the standards mounted thereon, the roller-bar journaled in the upper ends of the standards, said bar having its opposite ends terminating in winding-heads; the lever secured to the said bar; and the end brackets projected forwardly from the frame 1 of the scraper-board 9, said board being of a length so its opposite ends extend beyond the wheels on the frame 1 and of a height greater than that of the wheels, a draft-pole fixedly secured to and projected forwardly from the board 9; a rack-frame projected rearwardly from the upper edge of the board 9 and arranged to coöperate with the hand-lever; angle-brackets projected rearwardly from the board 9; the driver's seat mounted on the upper edge of the board, said board 9 having a flexible connection with the link-brackets that project from the frame 1 and chain connected to the outer ends of the brackets on the rear of the board 9 and wound about and secured to the end heads of the roller-bar having the hand-lever, all being arranged substantially as shown and for the purposes described.

DAVID A. SAVAGE.

Witnesses:
WARREN A. EVANS,
ROBERT L. NIX.